United States Patent [19]

Ishihara et al.

[11] Patent Number: 4,794,035
[45] Date of Patent: Dec. 27, 1988

[54] MAGNETIC RECORDING MEDIUM

[75] Inventors: Heigo Ishihara, Tokyo; Takanori Kudo; Tomoyuki Ohno, both of Kokubunji; Motoo Akagi, Tokyo, all of Japan

[73] Assignee: Hitachi, Ltd., Tokyo, Japan

[21] Appl. No.: 93,205

[22] Filed: Sep. 4, 1987

[30] Foreign Application Priority Data

Sep. 10, 1986 [JP] Japan ................... 61-211559

[51] Int. Cl.⁴ .......................... G11B 5/72; G11B 5/71
[52] U.S. Cl. ................................ 428/219; 427/128;
427/131; 428/215; 428/216; 428/341; 428/421;
428/422; 428/694; 428/695; 428/900
[58] Field of Search ............. 428/695, 694, 422, 900,
428/421, 215, 216, 340, 341, 219, 403; 427/131,
132; 360/134–136

[56] References Cited

U.S. PATENT DOCUMENTS

| 4,120,995 | 10/1978 | Phipps | 428/695 |
| 4,368,239 | 1/1983 | Nakajima | 428/900 |
| 4,446,193 | 5/1984 | Afzali-Ardakani | 428/695 |
| 4,536,444 | 8/1985 | Sumiya | 427/131 |
| 4,583,145 | 4/1986 | Mönnich | 428/695 |
| 4,624,892 | 11/1986 | Ishizaki | 428/331 |
| 4,642,246 | 2/1987 | Janssen | 428/422 |
| 4,659,633 | 4/1987 | Yamaguchi | 427/131 |
| 4,692,378 | 9/1987 | Ishihara | 428/900 |
| 4,696,845 | 9/1987 | Yanagisawa | 427/331 |
| 4,722,859 | 2/1988 | Kudo | 428/900 |

Primary Examiner—Ellis P. Robinson
Attorney, Agent, or Firm—Antonelli, Terry & Wands

[57] ABSTRACT

A magnetic recording medium which has a magnetic coating film that contains magnetic particles in a binder and which further has a lubricating layer formed on the magnetic coating film. The magnetic coating film has a surface that is processed with both a fluorinated surface treatment agent that bonds to the magnetic particles and a fluorinated surface treatment agent that bonds to the binder. The magnetic recording medium exhibits markedly improved sliding strength when the surface treatment agents and the lubricant have similar molecular structures. It is particularly preferred that the fundamental skeleton in the molecular structure of the surface treatment agents and the lubricant consists of a perfluoropolyether chain.

9 Claims, 1 Drawing Sheet

MAGNETIC RECORDING MEDIUM

BACKGROUND OF THE INVENTION

The present invention relates to a magnetic recording medium, and particularly to a magnetic recording medium having excellent wear resistance that can be used for magnetic disks, floppy disks, magnetic tapes and magnetic cards.

Magnetic recording media usually consist of a magnetic film applied onto substrates of a variety of types. At the time of recording and reproducing the data, the surface of the magnetic film is rubbed with the magnetic head. Therefore, the magnetic film is worn out causing the properties thereof to be seriously deteriorated.

So far, therefore, it has been widely attempted to apply a lubricant onto the surface of the magnetic film in order to improve wear resistance. As the lubricant, use can be made of a silicone oil, higher fatty acid, higher fatty acid ester, higher fatty acid salt, or an organic fluorine compound such as perfluoropolyether. Amon them, the perfluoropolyether which is a fluorinated lubricant has been known because of its relatively excellent properties. For instance, U.S. Pat. No. 3,778,308 discloses the perfluoropolyether as a desirable lubricant for the magnetic recording media. In recent years, furthermore, there has been proposed a lubricant in which the terminal structure of the perfluoropolyether is improved. There has, for example, been known a perfluoropolyether having a polar terminal group as disclosed in U.S. Pat. No. 3,847,978. Furthermore, it has been proposed to apply the perfluoropolyether having the polar terminal group to the magnetic recording media, i.e., to use it as a lubricant that can be cleaned with isopropyl alcohol and that adheres well to the magnetic recording media (U.S. Pat. No. 4,268,556).

According to the above-mentioned conventional art, however, a single lubricant is simply applied without giving much attention to the structure of the lubricating film. Therefore, the wear resistance is improved to some extent but not to a satisfactory degree. At present, therefore, it is desired to further improve the wear resistance.

Furthermore, U.S. patent application Ser. Nos. 795,261 now U.S. Pat. No. 4,692,378 and 904,403 that are still pending and not published describe the application of perfluoropolyether to the magnetic recording media.

SUMMARY OF THE INVENTION

The object of the present invention is to provide a highly reliable magnetic recording medium having excellent durability supported by improved wear resistance of the magnetic film, which is free from the above-mentioned problems inherent in the conventional art.

The above-mentioned object is achieved by treating the surface of the magnetic film with a fluorinated surface treatment agent to stabilize it, and providing thereon a lubricant layer having a molecular structure similar to that of the fluorinated surface treatment agent. The fluorinated surface treatment agent and the lubricant should particularly preferably be those compounds that have a perfluoropolyether chain which exhibits excellent properties as a lubricant, i.e., should be materials having a fundamental skeleton represented by the formula $-(C_kF_{2k})-n$ (wherein k is an integer of 1 to 4, and n is an integer of 3 to 100).

In a coating-type magnetic recording medium comprised of a magnetic coating material which contains magnetic particles and a binder, the magnetic coating film has a composite surface constituted by the magnetic particles and the binder. It is difficult to stabilize the surface using a single surface treatment agent. That is, the magnetic coating film having a stabilized surface can be obtained by suitably combining a surface treatment agent having at the terminals functional groups that bond to magnetic particles and a surface treatment agent having at the terminals functional groups that bond to the binder. Examples of the functional group that bonds to the magnetic particles include $-COOH$, $-COOM$ (M is a metal atom), $-CO_2R$ (R is an alkyl group), $-SiOR$ (R is an alkyl group), and $-CH_2OH$. Examples of the functional group that bonds to the binder include $-NH_2-NCO$, $-N_3$, $-CH=CH_2$,

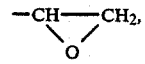

$-Br$ and $-I$. As required, the functional group bonds to the binder is subjected to the treatment of chemical bonding such as heat treatment or treatment of ultraviolet ray irradiation.

The surface treatment agent is applied to the surface of the magnetic coating film by the dip coating method, spray method, or spin coating method. That is, a mixture of the surface treatment agent that bonds to the magnetic particles and the surface treatment agent that bonds to the binder, is applied onto the surface to treat it. Or, the above-mentioned surface treatment agents are alternatingly applied by any one of the above-mentioned coating methods. The mixing ratio of the mixture is not particularly important. For example, the surface treatment agent of either one of them may be mixed over a range of 9 to 95% by weight. The ratio at which the binder and the magnetic particles are present on the surface of the magnetic film roughly determines the amount of adhesion, and the mixing ratio of the raw materials does not have important meaning.

Unlike the conventional lubricating film, the lubricating film in the magnetic recording medium of the present invention has a dense fluorinated surface treatment film which bonds to the magnetic particles and the binder. Therefore, even the single layer of the surface treatment film has the improvement of the wear resistance to some extent. Moreover, the fluorinated lubricant is applied onto the layer of the surface treatment agent, the lubricant having a structure similar to the molecular structure of the surface treatment agent. Therefore, the surface treatment layer works as an adhesion promoting layer for the lubricant, and the wear resistance increases remarkably.

DESCRIPTION OF THE PREFERRED EMBODIMENTS

Figure 1:
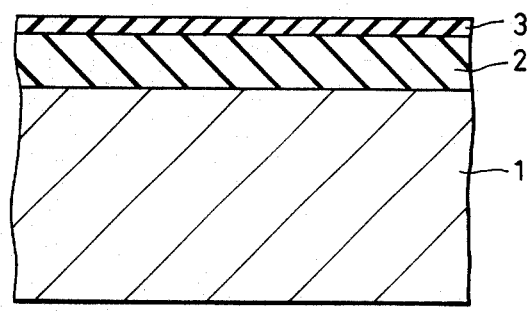
FIG. 1 is a section view illustrating a magnetic recording medium according to an embodiment of the present invention.

The surface treatment agents that bond to the magnetic particles have e.g. the following formulas,

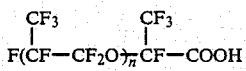
(A1)

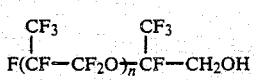
(A2)

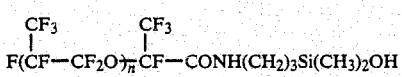
(A3)

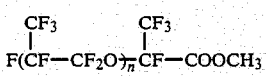
(A4)

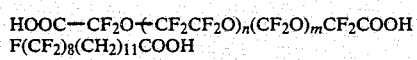

$HOOC-CF_2O+CF_2CF_2O)_n(CF_2O)_mCF_2COOH$ (A5)
$F(CF_2)_8(CH_2)_{11}COOH$ (A6)

wherein the agents of the formulas (A1) to (A5) have a molecular weight of about 1,000 to 10,000.

The surface treatment agents that bond to the binder have e.g. the following formulas,

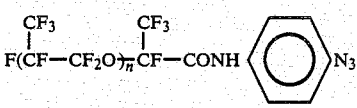
(B1)

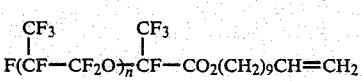
(B2)

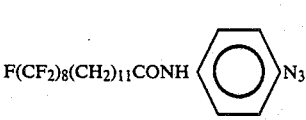
(B3)

wherein the agents (B1) and (B2) have an average molecular weight of from about 1,000 to about 10,000.

Further, the lubricants have e.g. the following formulas,

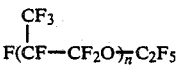
(C1)

$CF_3O-(CF_2CF_2O)_n(CF_2O)_mCF_3$ (C2)
$F(CF_2)_7(CH_2)_6H$ (C3)

wherein the lubricants (C1) and (C2) have an average molecular weight of from about 2,000 to about 15,000.

It is recommended to combine the surface treatment agents and the lubricant having resembling molecular structures. That is, the three agents should be those of the polyether type such as the above-mentioned gents (A1), (A2), (A3), (A4), (A5), (B1), (B2), (C1), and (C2), or the three agents should be those of the non-polyether type such as the above-mentioned agents (A6), (B3) and (C3).

The surface treatment agents and the lubricant are dissolved in solvents to obtain solutions and are applied onto the surface of the magnetic coating film. When the surface treatment agents and the lubricant have a perfluoropolyether chain $+C_kF_{2k}+_n$ as a fundamental skeleton, the solvent should be e.g., 1,1,2-trichlorotrifluoroethane (D1)

perfluoroalkylpolyether (D2)

perfluorotetrahydrofuran (D3)

where the solvent (D2) has a molecular weight Mw of as small as, for example, 400.

When the surface treatment agents and the lubricant do not have $+C_kF_{2k}+_n$ as a fundamental skeleton, but have, for example,

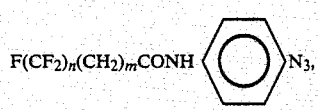

it is recommended to use the solvent (D1).

Concentrations of the solution of surface treatment agents and of the solution of lubricant, and the solvent, change depending upon the coating method as described below.

(i) In the case of spray coating, the solvent of a small viscosity such as (D1) or (D3) mentioned above and a concentration of from 0.1 to 2% by weight may be used. When the concentration is smaller than 0.1% by weight, an extended period of time is undesirably required for effecting the coating. When the concentration is greater than 2% by weight, on the other hand, it becomes undesirably difficult to control the thickness of the lubricant film. The thickness of film is adjusted by adjusting the spray time.

(ii) In the case of dip coating, a highly volatile solvent such as (D1) or (D3) mentioned above and a concentration of from 0.01 to 10% by weight may be used. When the concentration is smaller than 0.01% by weight, the thickness of the lubricating film becomes undesirably too small. When the concentration is greater than 10% by weight, on the other hand, the lubricating film is coated undesirably irregularly. The thickness of film is controlled by the concentration of solution, temperature and the rate at which the material being coated is pulled up.

(iii) In the case of spin coating, it is recommended to use the solvent (D2) having a low molecular weight. This is because, the solvent (D2) has a low volatility and imparts a suitable viscosity. The concentration of solution is controlled depending upon the thickness of the film.

The surface treatment agent should be adhered onto the surface of the magnetic film in an amount of 2 to 40 mg/m$^2$ (the corresponding surface treatment layer should have a thickness of 11 to 211 angstroms). When the amount of adhesion is smaller than 2 mg/m$^2$, the surface of the magnetic film is not favorably coated with the surface treatment agent. When the amount of adhesion is greater than 40 mg/m$^2$, on the other hand, space increases between the magnetic head and the magnetic film of the magnetic recording medium, and loss increases in the reproduced output.

The lubricant should be adhered in an amount of 2 to 98 mg/m$^2$ (the corresponding film should have a thickness of 11 to 516 angstroms). Desirably, therefore, the total amount of adhesion of the surface treatment agents and the lubricant lies over a range of from 4 to 100 mg/m$^2$ (the corresponding film has a thickness of 11 to 526 angstroms). When the amount of adhesion of the lubricant is smaller than 2 mg/m², the surface of the magnetic film is not desirably coated, and sufficient lubricating effect is not obtained. When the total amount of adhesion of the surface treatment agents and the lubricant exceeds 100 mg/m², on the other hand, space increases between the magnetic head and the magnetic film of the magnetic recording medium, and loss increases in the reproduced output.

When the surface treatment agent that bonds to the magnetic particles and the surface treatment agent that bonds to the binder are applied onto the surface of the magnetic film without applying the lubricant, the magnetic recording medium still exhibits superior properties to those of the conventional media that are coated with a lubricant alone, though the wear resistance decreases compared with that of when the lubricant is used. In this case, the surface treatment agents are adhered in an amount of 2 to 40 mg/m² (the corresponding film has a thickness of 11 to 211 angstroms).

As mentioned above, after having been coated, the surface treatment agent that bonds to the binder is subjected, as required, to the heat treatment or to the treatment with ultraviolet rays. Concrete conditions therefor can be easily determined through experiments for the surface treatment agents. For example, when the surface treatment agent (B1) that bonds to the binder is used, i) it is heat-treated in an nitrogen atmosphere at 150° C. for about 30 minutes, ii) it is irradiated with ultraviolet rays using a 3-KW metal halide lamp in an nitrogen atmosphere for three minutes, or iii) it is irradiated with ultraviolet rays using a 600-W Hg-Xe lamp for 30 minutes.

Embodiments will now be described concretely in conjunction with FIGS. 1 and 2.

First, described below are matters common to the embodiments and to the comparative examples.

A magnetic coating film was obtained by applying, onto an aluminum alloy substrate 1 having a composition of 96% by weight of aluminum and 4% by weight of magnesium and having a diameter of 14 inches, a widely known magnetic coating material prepared by dispersing magnetic particles ($\gamma$-Fe$_2$O$_3$) and a reinforcing agent ($\alpha$-Al$_2$O$_3$ powder) in a suitable amount of solvent and a binder composed of an epoxy resin, a phenolic resin and a polyvinylbutyral, followed by the thermosetting and surface finishing. The content of the magnetic particles was about 25% by volume.

The lubrication treatment was effected by spray-coating the surface of the magnetic coating film 2 formed as described above with a solution obtained by dissolving the surface treatment agent or the lubricant in an amount of 0.5% by weight in a 1,1,2-trichlorotrifluoroethane, and then wiping it with a cotton gauze tape in a spiral manner under a pressure of about 1 kg/cm² while rotating the disk at 400 to 1500 rpm. The surface treatment agent which was applied by the above-mentioned method in an excess amount as great as about 500 mg/m² is, as required, optically bonded by the treatment with heat or with the irradiation of ultraviolet rays, and the magnetic coating film was washed with ultrasonic waves in the 1,1,2-trichlorotrifluoroethane for about 10 minutes, in order to remove the liberated surface treatment agent. In the case of the lubricant, the spray time was adjusted to control the amount of adhesion of the lubricant. The amounts of adhesion of the surface treatment agents and the lubricant were measured by the Fourier transform infrared spectroscopy (FT-IR spectroscopy).

In the embodiments and comparative examples that will be mentioned below, the coated solution was wiped with a gauze tape onto the disk. The above process, however, is a favorable one, and the effect of the present invention can be sufficiently expected even without such a process.

The wear resistance was evaluated by pressing a single crystalline $\alpha$-alumina slider (a spherical slider having a radius of curvature of 30 mm) onto a magnetic disk obtained by the above-mentioned method with a load of 20 g, repetitively rubbing the surface at a sliding speed of 20 m/sec., and measuring the number of rubs (called sliding strength) before scratches developed on the surface of the magnetic recording medium.

The measured results of the embodiments and of the comparative examples are shown in Table 1.

Figure 2:
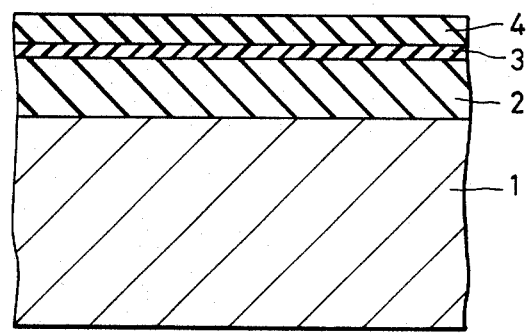
FIG. 2 is a section view illustrating magnetic recording medium according to another embodiment of the present invention.

In FIGS. 1 and 2, reference numeral 1 denotes a substrate, 2 denotes a magnetic coating film, 3 denotes a layer of the surface treatment agent, and 4 denotes a layer of the lubricant.

In the drawings, the magnetic recording layer is provided on one surface only of the substrate 1. The magnetic recording layer, however, may be provided on both surfaces of the substrate, as a matter of course.

EXAMPLE 1

An $\omega$-polyhexafluoropropylene oxide carboxylic acid of the aforementioned formula (A1) having an average molecular weight of 4,500 was used as the surface treatment agent that bonds to magnetic particles, and an $\omega$-polyhexafluoropropylene oxide carboxyamide-p-phenylene azide of the afore-mentioned formula (B1) having an average molecular weight of 4,600 was used as the surface treatment agent that bonds to the binder.

The surface treatment is effected by applying the surface treatment agent (A1) that bonds to the magnetic powder onto the substrate by the above-mentioned method, washing it with a 1,1,2-trichlorotrifluoroethane, applying the surface treatment agent (B1) thereon, followed by the irradiation with ultraviolet rays from a 600-W Hg-Xe lamp for 30 minutes so that it was bonded to the binder. Thereafter, the ultrasonic wave washing was effected for 10 minutes in the 1,1,2-trichlorotrifluoroethane to obtain a specimen shown in FIG. 1.

EXAMPLE 2

The lubricant of the aforementioned formula (C1), i.e., the polyhexafluoropropylene oxide was applied onto the surface of the specimen obtained by the same method as that of Embodiment 1, thereby to obtain a specimen shown in FIG. 2.

COMPARATIVE EXAMPLE 1

The surface treatment agent (A1) was applied by the above-mentioned method, and the liberated surface treatment agent was washed and removed with ultrasonic waves to obtain a specimen.

COMPARATIVE EXAMPLE 2

The surface treatment agent (B1) was applied by the above-mentioned method followed by the irradiation with ultraviolet rays for 30 minutes so that it was bonded to the binder, and the liberated surface treatment agent was washed and removed with ultrasonic waves to obtain a specimen.

COMPARATIVE EXAMPLE 3

The lubricant (C1) was applied onto the surface of the specimen obtained by the same method as that of Comparative Example 1, in order to obtain a specimen.

COMPARATIVE EXAMPLE 4

The lubricant (C1) was applied onto the surface of the specimen obtained by the same method as that of Comparative Example 2, in order to obtain a specimen.

COMPARATIVE EXAMPLE 5

The lubricant (C1) was applied onto the surface of the magnetic coating film whose surface had not been treated, in order to obtain a specimen.

Table 1 shows the amounts of adhesion of the surface treatment agents and of the lubricants of the specimens of the aforementioned Examples and Comparative Examples measured by the FR-IR spectroscopy as the film thicknesses reckoned with the specific gravity of the film as 1.9. The sliding strengths were also evaluated by the aforementioned method. The results were as shown in Table 1.

It will be understood from Table 1 that the magnetic coating film (Example 1) to which are simultaneously applied both the surface treatment agent (A1) of the type that bonds to the magnetic particles and the surface treatment agent (B1) of the type that bonds to the binder, has the total amount of adhesion of the surface treatment agents greater than that of the magnetic coating film (Comparative Examples 1 or 2 to which the surface treatment agent (A1) or (B1) is applied alone separately, and it will further be understood that the surface-treated film has improved uniformity. It is further obvious that the magnetic disk to which the surface treatment agents (A1), (B1) and the lubricant are simultaneously applied, exhibits the greatest sliding strength. Moreover, the magnetic disk of Example 1 to which the surface treatment agents only of the present invention are applied, exhibits a sliding strength that is greater than the sliding strength of the magnetic disk of Comparative Example 5 that has the lubricant only that is applied maintaining a thickness more than five times the thickness of the surface treatment agent of Example 1.

fore, the magnetic recording medium exhibits improved sliding strength. In particular, the magnetic recording medium which has a lubricating layer formed on the surface-treated film exhibits markedly increased durability and reliability.

What is claimed is:

1. In a magnetic recording medium in which a magnetic coating film having magnetic particles in a binder is provided on a substrate, the improvement wherein said magnetic coating fim has a surface that is treated with both a fluorinated surface treatment agent having functional groups at terminals that bond to the magnetic particles and a fluorinated surface treatment agent having functional groups at terminals that bond to the binder, wherein the amount of the surface-treated layer is from 2 to 40 mg/m$^2$, said surface-treated layer being comprised of said surface treatment agent that bonds to the magnetic particles and said surface treatment agent that bonds to said binder.

2. A magnetic recording medium according to claim 1, wherein a fundamental skeleton of said surface treatment agent that bonds to the magnetic particles and of said surface treatment agent that bonds to the binder, consists of a perfluoropolyether chain.

3. A magnetic recording medium according to claim 1, wherein a layer of a fluorinated organic lubricant is further provided on said surface-treated layer, and wherein said organic lubricant is used in an amount of from 2 to 98 mg/m$^2$.

4. A magnetic recording medium according to claim 2, wherein a layer of a fluorinated organic lubricant is further provided on said surface-treated layer.

5. A magnetic recording medium according to claim 4, wherein the fundamental skeleton of said organic lubricant consists of a perfluoropolyether chain.

6. A magnetic recording medium comprising:
a substrate;
a magnetic coating film provided on said substrate, said magnetic coating film, including a surface thereof, having magnetic particles dispersed in a binder; and
a surface-treated layer adhered to said surface of said magnetic coating film in an amount of 2 to 40 mg/m$^2$ comprising both a fluorinated surface treatment agent having functional groups at terminals

TABLE 1

| Example No. | Comparative Example No. | Surface treatment agent | Total amount of adhesion of surface treatment agent (Å) | Lubricant (film thickness in Å) | Sliding strength (× 10$^3$ times) |
|---|---|---|---|---|---|
| 1 | — | (A) and (B) | 47 Å | — | 12.9 |
| 2 | — | (A) and (B) | 45 Å | (C) 212 Å | 36.2 |
| — | 1 | (A) | 19 Å | — | 4.6 |
| — | 2 | (B) | 31 Å | — | 7.8 |
| — | 3 | (A) | 21 Å | (C) 231 Å | 18.7 |
| — | 4 | (B) | 34 Å | (C) 227 Å | 25.7 |
| — | 5 | — | — | (C) 254 Å | 11.8 |

In the above-mentioned Examples, the surface treatment agents (A1) and (B1) were alternatingly applied. The same effects as those of the Examples, however, were also obtained even when the surface treatment agents (A1) and (B1) were simultaneously applied as a mixture.

In the coating type magnetic recording medium of the present invention as described in detail in the foregoing, the magnetic coating film exhibits improved uniformity as a result of treatment with both the fluorinated surface treatment agent of the type that bonds to the magnetic particles and the fluorinated surface treatment agent of the type that bonds to the binder. There-that bond to said magnetic particles and a fluorinated surface treatment agent having functional groups at terminals that bond to said binder, wherein said fluorinated surface treatment agent having functional groups at terminals that bond to said magnetic particles is selected from the group consisting of

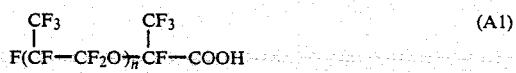

-continued

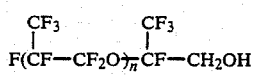 (A2)

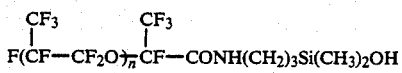 (A3)

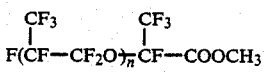 (A4)

HOOC—CF$_2$O+(CF$_2$CF$_2$O)$_n$(CF$_2$O)$_m$CF$_2$COOH (A5)

and

F(CF$_2$)$_8$(CH$_2$)$_{11}$COOH, (A6)

wherein the agents of the formulae (A1) to (A5) have a molecular weight of about 1,000 to about 10,000 and wherein said fluorinated surface treatment agent having functional groups at terminals that bond to said binder is selected from the group consisting of

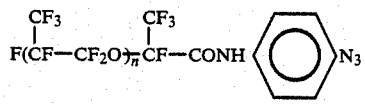 (B1)

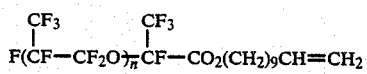 (B2)

and

 (B3)

wherein the agents (B1) and (B2) have an average molecular weight of from about 1,000 to about 10,000.

7. A magnetic recording medium according to claim 6, further comprising a lubricant adhered to said surface-treated layer in an amount of from 2 to 98 mg/m$^2$, wherein said lubricant is selected from the group consisting of

 (C1)

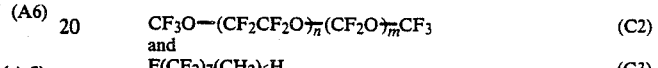 (C2)

and

F(CF$_2$)$_7$(CH$_2$)$_6$H, (C3)

wherein the lubricants (C1) and (C2) have an average molecular weight of from about 2,000 to about 15,000.

8. A magnetic recording medium according to claim 6, wherein said fluorinated surface treatment agent having functional groups at terminals that bond to said magnetic particles is selected from the group consisting of said formulae (A1), (A2), (A3), (A4) and (A5), and said fluorinated surface treatment agent having functional groups at terminals that bond to said binder is selected from the group consisting of said formulae (B1) and (B2).

9. A magnetic recording medium according to claim 7, wherein said fluorinated surface treatment agent having functinal groups at terminals that bond to said magnetic particles is selected from the group consisting of said formulae (A1), (A2), (A3), (A4) and (A5), said fluorinated surface treatment agent having functional groups at terminals that bond to said binder is selected from the group consisting of said formulae (B1) and (B2), and wherein said lubricant is selected from the group consisting of said formulae (C1) and (C2).

* * * * *